United States Patent
Campbell (10) Patent No.: US 9,776,087 B1
(45) Date of Patent: Oct. 3, 2017

(54) METHOD AND/OR APPARATUS FOR IMPLEMENTING A GAME UNIVERSE STATE PRESERVATION AND/OR REVIEW FEATURE IN A VIDEO GAME SYSTEM

(75) Inventor: Jeffery R. Campbell, San Francisco, CA (US)

(73) Assignee: Ambarella, Inc., Santa Clara, CA (US)

( * ) Notice: Subject to any disclaimer, the term of this patent is extended or adjusted under 35 U.S.C. 154(b) by 2533 days.

(21) Appl. No.: 11/750,555

(22) Filed: May 18, 2007

(51) Int. Cl.
  *A63F 13/497* (2014.01)
  *A63F 13/493* (2014.01)
  *A63F 13/45* (2014.01)
  *A63F 13/49* (2014.01)

(52) U.S. Cl.
  CPC .......... *A63F 13/497* (2014.09); *A63F 13/493* (2014.09); *A63F 13/45* (2014.09); *A63F 13/49* (2014.09); *A63F 2300/60* (2013.01); *A63F 2300/63* (2013.01); *A63F 2300/634* (2013.01); *A63F 2300/636* (2013.01)

(58) Field of Classification Search
  CPC ........ A63F 13/00; A63F 13/45; A63F 13/497; A63F 13/50; A63F 13/52; A63F 13/55; A63F 13/56; A63F 13/57; A63F 2300/00; A63F 2300/60; A63F 13/10; A63F 13/48; A63F 13/49; A63F 13/493; A63F 2300/63; A63F 2300/634; A63F 2300/636
  USPC ................................................ 463/1, 30, 31
  See application file for complete search history.

(56) References Cited

U.S. PATENT DOCUMENTS

| 6,336,865 B1* | 1/2002 | Kinjo .............................. 463/34 |
| 6,699,127 B1* | 3/2004 | Lobb et al. ..................... 463/43 |
| 2004/0224741 A1* | 11/2004 | Jen et al. .......................... 463/6 |
| 2005/0149849 A1* | 7/2005 | Graham et al. ............... 715/500 |

OTHER PUBLICATIONS

Entire movies compressed into single barcodes, (Mar. 7, 2011, retrieved from, http://flowingdata.com/2011/03/07/entire-movies-compressed-into-single-barcodes/), pp. 1-3.*

* cited by examiner

*Primary Examiner* — Jasson Yoo
(74) *Attorney, Agent, or Firm* — Christopher P. Maiorana, PC (57) ABSTRACT

An apparatus comprising a game engine circuit, a controller circuit and a replay circuit. The game engine circuit may be configured to generate a video signal that represents a real time game environment. The controller circuit may be configured to present signals received from a game user. The signals may be configured to control operations of an avatar of a game player within the real time game environment. The replay circuit may be configured to store a frame comprising (i) one or more portions of the video signal and (ii) one or more game restore points. The stored frames may be configured to (i) allow the game user to review a previously played portion of the game environment and (ii) resume playback in the real time game environment from one of the game restore points.

19 Claims, 12 Drawing Sheets

METHOD AND/OR APPARATUS FOR IMPLEMENTING A GAME UNIVERSE STATE PRESERVATION AND/OR REVIEW FEATURE IN A VIDEO GAME SYSTEM

FIELD OF THE INVENTION

The present invention relates to video games generally and, more particularly, to a method and/or apparatus for implementing a game universe state preservation operation and/or review feature in a video game system.

BACKGROUND OF THE INVENTION

Conventional video game systems often provide a series of scenes presented sequentially. Each scene often provides a number of challenges that need to be overcome before a player moves on to the next scene. If a player fails to overcome the challenges within a predefined number of attempts, the game is over. When the player starts a new game, the scenes already completed are replayed. A player then replays easy scenes, but then is still left to overcome the previously uncompleted scene. If a player continually gets stuck at a particular scene, such a player often becomes frustrated.

One solution to avoid replaying scenes is disclosed in U.S. Pat. No. 6,699,127, entitled "Real-time replay system for video game", issued on Mar. 2, 2004. U.S. Pat. No. 6,699,127 proposes a system to save keyframe information for re-rendering the game universe on subsequent playback. However, such a system is limited to saving keyframe information, which provides limited playback options. In particular, a game user in such a system is limited to returning to the certain saved keyframe locations.

It would be desirable to implement a mechanism to capture encoded video and/or audio to be used along with saved keyframes, or other information, to re-render a game universe on playback after optionally replaying a scene using trickplay features.

SUMMARY OF THE INVENTION

The present invention concerns an apparatus comprising a game engine circuit, a controller circuit and a replay circuit. The game engine circuit may be configured to generate a video signal that represents a real time game environment. The controller circuit may be configured to present signals received from a game user. The signals may be configured to control operations of an avatar of a game player within the real time game environment. The replay circuit may be configured to store a frame comprising (i) one or more portions of the video signal and (ii) one or more game restore points. The stored frames may be configured to (i) allow the game user to review a previously played portion of the game environment and (ii) resume playback in the real time game environment from one of the game restore points.

The objects, features and advantages of the present invention include providing a game system that may (i) provide a review mode, (ii) provide smooth frame by frame trickplay in either playback decode direction, (iii) avoid using the graphics and/or sound rendering engine of a game system to re-create the game universe during review, and/or (iv) free game system resources during review to perform other activities.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be used to provide a mechanism to review game play of a video game system using smooth trickplay features. The present invention may allow for restoration of a game universe, review of previous game play, and continuation of previous game play seamlessly from previously saved game play, referred to generally as a gameshift. The present invention may provide a mechanism to review game play using smooth trickplay features and may allow for restoration and/or continuation of video game play seamlessly from previous save points.

Figure 1:
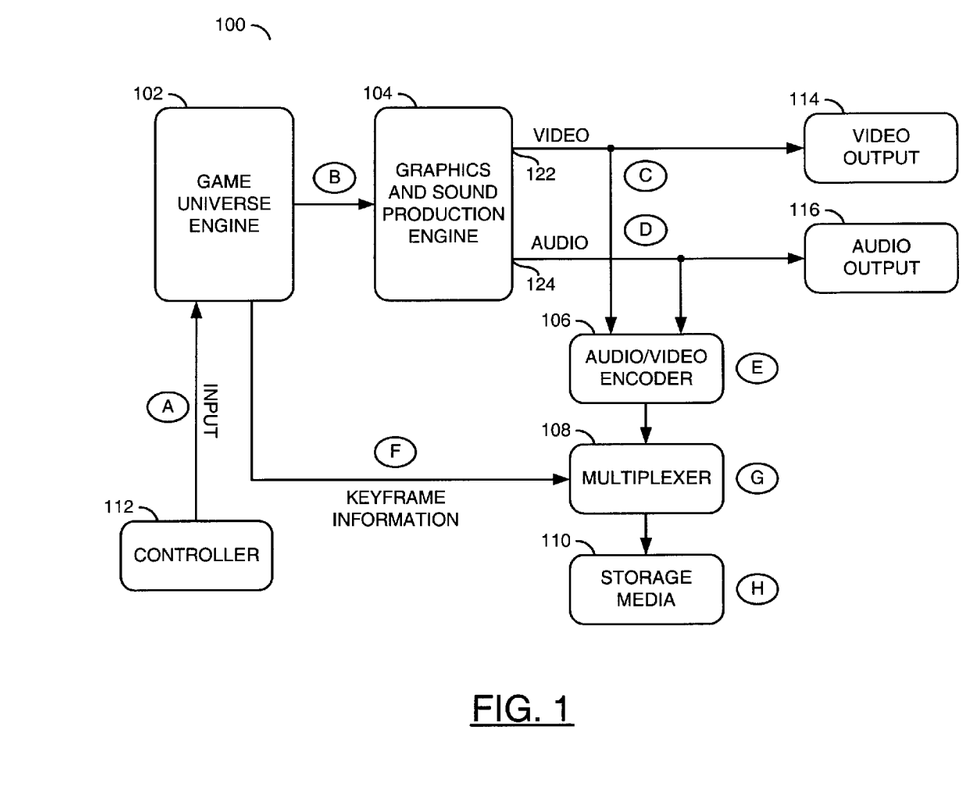
FIG. 1 shows a simplified block diagram with data flow of a game system with gameshift technology implemented.

Referring to FIG. 1, a block diagram of a system 100 is shown in accordance with a preferred embodiment of the present invention. A system 100 generally comprises a block (or circuit) 102, a block (or circuit) 104, a block (or circuit) 106, a block (or circuit) 108, a block (or circuit) 110, a block (or circuit) 112, a block (or circuit) 114 and a block (or circuit) 116. The circuit 102 may be implemented as a game universe engine circuit. The circuit 104 may be implemented as a graphics and sound production engine circuit. The circuit 106 may be implemented as an audio/video encoder circuit. The circuit 108 may be implemented as a multiplexer circuit. The circuit 110 may be implemented as a storage circuit. The circuit 112 may be implemented as a controller circuit. The circuit 114 may be implemented as a video output circuit. The circuit 116 may be implemented as an audio output circuit. The circuit 106, the circuit 108, and the circuit 110 may be referred to as a replay circuit.

The system 100 may allow a video game player (e.g., a game user, operator, etc.) to review previous game play after pausing real time (e.g., live) game play. Such review and/or pausing may occur at any time in a game sequence, even after a player has lost a particular game. The previous game play may be reviewed (e.g., a review mode) using common trickplay functions, similar to the trickplay functions that are present on most DVD player systems and/or personal video recorder (PVR) systems. Such trickplay functions include, but are not limited to, 1/64×, 1/32×, 1/16×, 1/8×, 1/4×, 1/2×, 1×, 2×, 4×, 8×, 16×, 32×, 64×, and "step" (e.g., a frame by frame advance) in either the forward or backward direction. The system 100 may also allow the player to move from review mode back to game play mode from a state and time previous to the state and time the player originally paused real time game play to enter review mode.

The system 100 may use inline keyframes that may be periodically recorded (e.g., stored in the storage media circuit 110) together with the encoded video and/or audio information. The keyframes may be a set of data that may represent a restore point used by the game universe engine 102 to restore the game to a particular previously accessed state. The encoded video and/or audio information may be buffered after the player selects a real time game play pause option. In one example, the pause feature may be activated during a live game session. The buffered game play may then be stored as encoded video and/or audio that may be decoded and reviewed using common video and/or audio decoding techniques, with trickplay functions available. In one example, a player may review a particularly difficult scene at a slower speed in order to decrease the skill level needed to successfully navigate such a scene on a subsequent real time session.

In addition to review and trickplay functionality, the game may be rewound to any keyframe embedded with the encoded audio and/or video. Once rewound to a particular keyframe, the game universe may be restored from the data present in the particular keyframe. At any keyframe embedded in the bit stream, the player may take-over the action and use the game controller (or other input device) to begin real time game play from that point in the sequence.

Upon restarting real time game play, the video and/or audio output presented to the player during real time game play may be encoded and seamlessly stitched to the buffered encoded video and/or audio that may be found in the storage media 110 previous to the state and time of continuation of real time game play. This allows for a seamless stream of encoded video and/or audio that may be decoded and reviewed in the future as if the stream was one continuously played gaming session. Such buffering will be described in more detail in connection with FIGS. 4-6.

The system 100 in FIG. 1 illustrates a number of block diagrams having data flow of a game system. In FIG. 1, normal game play data flow is illustrated. In one example, the controller circuit 112 may be implemented as logic within the game universe engine 102 that may allow the user to present a command (e.g., INPUT) to the game universe engine 102. In one example, the controller circuit 112 may be implemented as a discrete circuit separate from the game universe engine 102. The command signal INPUT may include voice, body, hand and finger movements, etc. The command signal INPUT may fall into to two broad categories (i) real time game play commands and (ii) game play review trickplay and/or edit commands.

Game play commands may include commands that are generated using a game controller operated by a player. Such a game controller may plug into the controller circuit 112. Game play commands may be used to manipulate the state of a game to advance the embodiment (e.g., an avatar on the display) of a player through the game universe over a period of time. Game play review and/or trickplay commands may also be generated from the controller circuit 112. Such commands are normally applicable when the game system 100 is in game play review and edit mode.

The controller 112 may also generate one or more edit commands that may allow a user to set markers in the game play video. The markers may be used to extract clips of game play from the video. The clips of game play may comprise frame accurate encoded video and/or audio data as well as (hidden) keyframe information (to be described in more detail in connection with FIGS. 9-13).

The game universe engine block 102 may be used to maintain state information that may be packaged as a keyframe. The game universe engine 102 may be configured to control movement from state to state within the game universe and/or for driving the graphics and sound production engine 104. The graphics and sound engine 104 may be used to render graphics and generate sound effects that are presented to the video and audio output logic blocks 114 and 116.

The circuit 104 may have an output 122 and an output 124. The output 122 may present a signal (e.g., VIDEO). The output 124 may present a signal (e.g., AUDIO). The signal VIDEO and the signal AUDIO may carry information that may be pipelined to the real time audio/video encoder circuit 106. The encoder circuit 106 may be used to enable the gameshift operation of the present invention. The encoder 106 may capture the signal VIDEO and the signal AUDIO that are presented to the game player and encode the captured data in any of a number of given compression formats. The particular compression format implemented (e.g., H.261, H.263, H.264, MPEG-1, MPEG-2, MPEG-4, VC-1, or other present or future encoding formats) may be varied to meet the design criteria of a particular implementation.

The multiplexer block 108 may be used to multiplex the compressed audio and/or video data, along with keyframe information, as such information is made available. The multiplexed data may then be streamed to the storage device 108. In one example, the storage device 108 may be implemented as a solid state device (e.g., Flash, etc.), a traditional hard disc drive (HDD) or other suitable storage device. The particular type of storage device may be varied to meet the design criteria of a particular implementation.

The flow for normal game play may be described as follows. An event A may occur between the controller circuit 112 and the game universe engine circuit 102. The player controls an avatar by using a controller input device to generate the signal INPUT, used by the game universe engine circuit 102 to control the rendered game universe.

An event B illustrates the interaction between the game universe engine circuit 102 and the graphics and sound production engine 104. As the game universe changes state, the graphics engine 104 displays these state changes in the form of rendered graphics and/or sound production on the signals VIDEO and/or AUDIO.

An event C and an event D show the rendered graphics data (as video) and sound production data (as audio) streaming to the video output circuit 114 and the audio output circuit 116. As data is being streamed to the output devices 114 and 116 for viewing by the player, the data may be intercepted and encoded in real time by the audio and video encoder block 106, shown as an event E. Simultaneous to the real time encoding of video and/or audio, the key frame information (representing game universe state) is normally presented to the multiplexer block (shown as an event F).

The multiplexer circuit 108 may be used to multiplex the encoded audio signal AUDIO, the encoded video signal VIDEO and the keyframe information into a single bit stream, illustrated by an event G. The keyframe information may be encoded and/or compressed by the game universe engine 102 and/or by another block of logic (not shown) between the game universe engine 102 and multiplexer logical block 108.

In a system 100 with abundant storage and/or processing resources, the keyframe information may be presented along with every video and/or audio frame. Depending on the amount of data needed to recreate the game universe, the amount of storage needed for per frame saves in a particular game and video console may be more than desirable. In general, keyframe information will be multiplexed into the bitstream when presented to the multiplexer circuit 108. If the keyframe information is absent, the multiplexer will insert a NULL frame (e.g., empty or filler information) into the bitstream to allow the decoder to properly locate and decode keyframe information. The insertion of a NULL frame will be described in more detail in connection with FIG. 6. The resulting multiplexed bit stream (e.g., MUX) may be streamed to a storage media or device (shown by an event H). The storage device 110 may be implemented as a circular buffer (to be described in more detail in connection with FIG. 4).

In addition to the review of a previously played game scene, the system 100 may be used to provide additional resources for a player to navigate through a particularly difficult scene. For example, the signal INPUT from the controller 112 may also be stored along with the signal VIDEO, the signal AUDIO, and the keyframe information. During a review of a particular scene, graphical representation of the previously played controller signal INPUT may be reviewed. Prior to a detrimental player sequence, the controller signal INPUT may be modified. For example, if the player moves his avatar to the right in the game universe, when the proper play would be to move to the left, the player may modify the signal INPUT during the review. Since changing the movement of the avatar in the game universe would change subsequent playback, the system 100 may be configured to automatically resume live playback mode from the point of the modification of the signal INPUT. In one example, the playback may be resumed at a slower than real time speed, to allow the player to successfully navigate through the difficult scene. Besides editing the signal INPUT, a graphical representation of the signal INPUT may be beneficial to another player learning how to navigate a successful scene.

Figure 2:
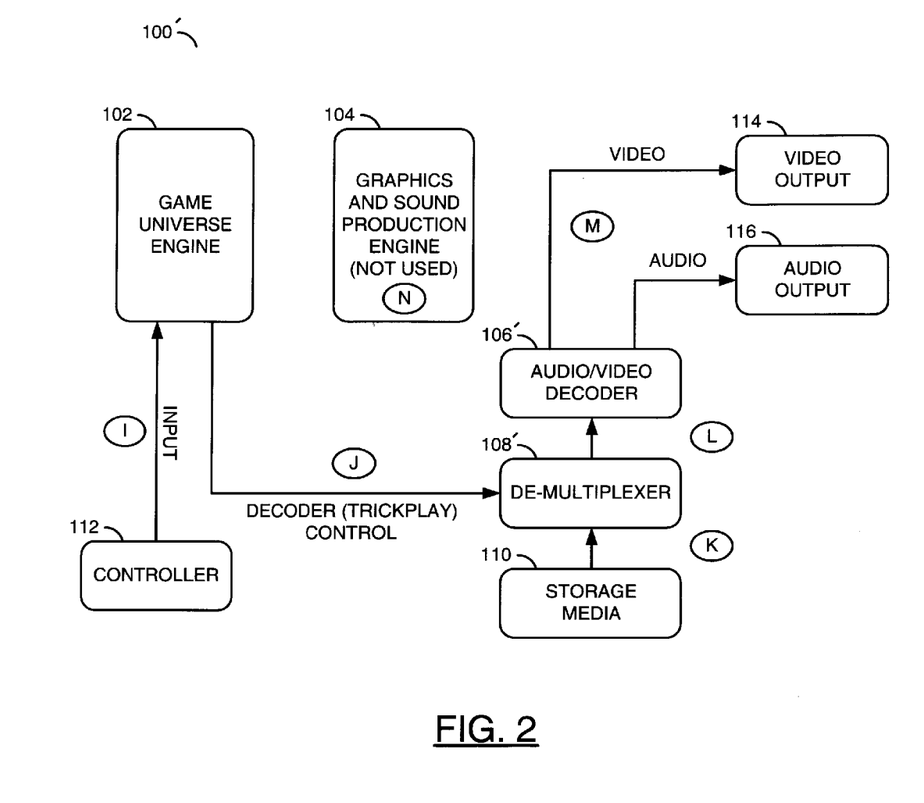
FIG. 2 shows a similar simplified block diagram of the system of FIG. 1, with game play paused where previously played game action may be reviewed using trickplay actions.

Referring to FIG. 2, a system 100' is shown illustrating data flow implementing the gameshift invention that is presently in game play review mode. The system 100' is similar to the system 100 of FIG. 1, with the system 100' illustrating the flow of the game review mode. In game play review mode, an on-screen display presented through the video output circuit 114 would prompt the game player to input actions through the controller circuit 112. The input actions may exercise trickplay functions built into the console software (e.g., the event I). In this state, real time game play has either paused or ended.

While in the review mode, instead of driving the graphics and sound production engine 104, the game universe engine circuit 102 converts the controller signal INPUT into decoder trickplay decode commands (e.g., the event J). The decoder commands may include, but are not limited to, 1×, 2×, 4×, 8×, 16×, 32×, 64×, ½×, ¼×, ⅛×, 1/16×, 1/32×, 1/64×, step, all of which are applicable in both forward and reverse direction. Pause functionality is also available to freeze and display one frame of the decoded video stream. The pause command may be applied to the trickplay modes listed above.

A de-multiplexer 108' (which normally operates in reverse of the multiplexer 108) may retrieve a bitstream from the storage circuit 110. The de-multiplexer 108' separates video, audio, and keyframe information at the event K. The de-multiplexer 108' may also be considered part of the replay circuit. The encoded audio and video slices are presented to the audio/video decoder logic circuit 106' for conversion into displayable video and audio, shown as an event L. The audio/video decoder 106' normally operates in reverse of the audio/video encoder 106. After decoding, the signal AUDIO and the signal VIDEO data are presented to the video circuit 114 and/or the audio output circuit 116 as a seamless stream to the player, shown as an event M.

In the system 100', keyframe information is not shown. The system 100' buffers keyframe data until a new keyframe arrives. The buffered keyframe data is normally maintained and used in the event that a player takes action to move the system 100' to the real time game play mode. In such a scenario, the keyframe data is referenced to reestablish the game universe.

The graphics and sound production engine 104 is not normally used in the game play review scenario. The resources of the graphics and sound engine 104 may be used for another purpose or remain in standby mode ready to render graphics and sound to represent the game universe in the event the user selects "continue game play", as shown by an event N.

Alternatively, to provide a more seamless transition from game play review mode to live game play continuation mode, the game universe engine circuit 102 may accept keyframe information from the decoded bitstream and instruct the graphics and sound production engine circuit 104 to reproduce the game universe internally—but not to display the results. In this way, the video game system 100' may be able to reduce the latency of moving to game play mode to provide a generally seamless experience to the player.

While in the review mode, editing capabilities may be available to the player. Editing functionality would allow the player to create audio and/or video clips that may be stored in a more permanent fashion. Such clips may be transmitted over the Internet, a local network, or other suitable media, to third parties possessing similar or compatible equipment. Such a third party would be able to view the audio and/or video clip on a locally available console. Such a third party may also continue game play using the keyframes embedded in the multiplexed bit stream. Additionally, such a third party would be able to view the video and audio on a decoder (or media player) compliant to the encoding technology or standard used to encode the audio and video, and simply ignore the keyframes. If the compressed audio/video is encapsulated into a format that other non-game console devices can understand—such devices may decode the audio/video and/or just ignore the keyframe data. Additionally, some game titles and/or console software may provide the ability to optionally expose or hide the keyframe information or selectively expose the keyframe information to limited members of the overall gaming community.

Figure 3:
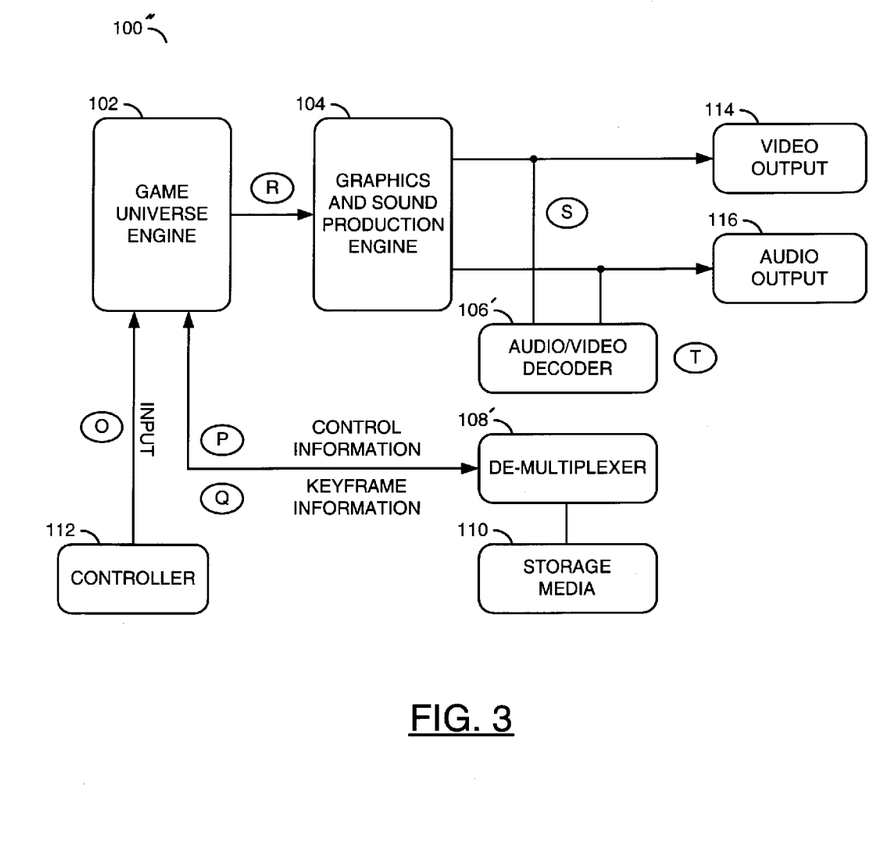
FIG. 3 shows a similar simplified block diagram as illustrated in FIG. 2 showing the data flow for game play continuation.

Referring to FIG. 3, a system 100" is shown illustrating data flow associated with continuation of game play after review and possible editing have occurred. The player will have the ability to continue game play at the game time represented by the nearest keyframe in the video/audio stream. The player may have the ability to enter game play mode from a key press or a combination of key presses or other action originating from the controller circuit 112. Optionally, the game title may have time shift features where an avatar is teleported back in time in the game universe to continue game play.

After game play mode is re-entered, the signals INPUT from the controlling circuit 112 move from trickplay decode and/or edit functionality (e.g., review mode) to game play functionality (e.g., live mode). Key strokes, button presses, or other actions are now interpreted as game play actions that alter the state and appearance of the game universe, as shown by an event O.

In the scenario of the player invoking the state change from game review mode to game play mode, the signals INPUT from the controller may be used to cause the game universe engine 102 to send a request to the de-multiplexer circuit 108' to retrieve the nearest keyframe, as shown by event P. The system 100 is normally in one of (i) a real time game play state (live mode) or (ii) a game play review and edit state (review mode). The game shift button, or a series of key presses or controller inputs, moves between states. The nearest keyframe information is retrieved and sent to the game universe engine 102, as shown by an event Q. The nearest keyframe may be a key frame corresponding to the state closest in time to the state of the game universe that produced the video and audio presently being decoded to the output modules.

After receiving the applicable keyframe information, the game universe engine 102 instructs the graphics and sound production engine 104 to begin rendering graphics and producing sound corresponding to the game universe state represented by the received keyframe, as shown by the event R.

Alternatively, the graphics and sound production engine 104 may have a start process that may have been synchronized with audio and/or video decode operation. In such a scenario, the game universe may simply instruct the graphics and sound production engine 104 to begin display to the audio and video output peripherals, as shown by the event S.

Upon entering this state, and before outputting the first frame from the graphics and sound production engine 104, the audio/video decoder circuit 106' block is normally disabled and the audio/video encoder circuit 106 is re-enabled, as shown by an event T. The encoded audio and/or video from the first frame output to the video output and audio output peripherals is normally encoded with the keyframe used to restore the game universe. This information is multiplexed into the existing bitstream seamlessly for future game play review.

Figure 4:
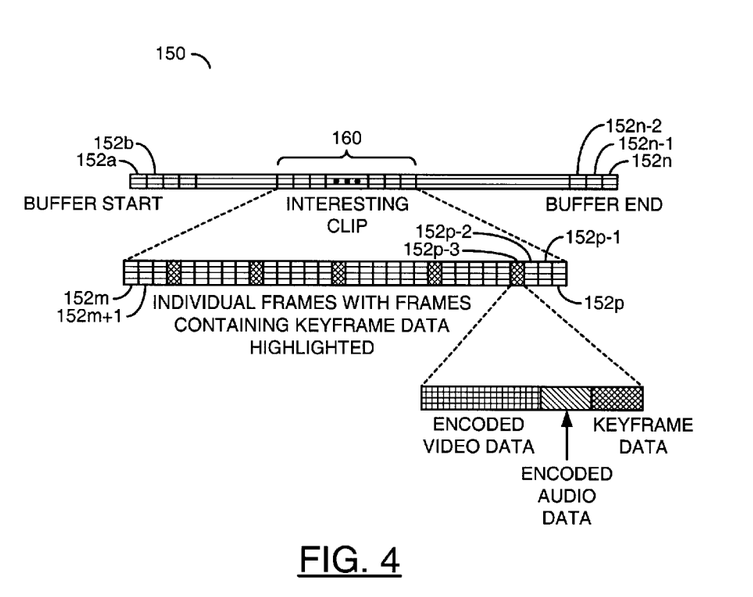
FIG. 4 illustrates the gameshift buffer format and contents.

Referring to FIG. 4, a buffer 150 is shown illustrating the contents of the storage media 110. In one example, the buffer 150 may be implemented as a circular buffer 150. The circular buffer 150 generally comprises a number of frames 152a-152n. When the capacity of the buffer 150 is reached, a first of the frames (e.g., the frame 152a) will be replaced with the latest frame (e.g., the frame 152n). The buffer generally provides a seamless audio/video experience with full buffer length on decode.

A subset of the buffer 150 is shown as an "Interesting Clip" 160. The clip 160 illustrates a portion of the buffer 150 that the game player may wish to edit, preserve locally, and/or transmit to a third party and/or broadcast to multiple parties for decoding and/or game play continuation. The clip 160 illustrates a number of individual compressed audio/video frames 152m, 152m+1, . . . , 152p-3, 152p-2, 152p-1, 152p, with frames containing keyframe data highlighted (e.g., the frame 152p-3). In one example, the system 100 would capture keyframe information on each of the frames 152a-152n. However, in certain implementations, the frequency that each keyframe is stored may be less often to conserve resources in the storage media 110 or due to performance restrictions on the system 100.

In one example, the encoded video data, the encoded audio data, and the keyframe data may be stored as data in compliance with a transport stream. One example of a transport stream is the transport stream described in the Blu-Ray disc specification, the appropriate sections of which are incorporated by reference. In such an example, a Blu-Ray disc drive would be able to play audio and/or video encoded along with keyframe information without modification to such a player. A Blu-Ray compliant player would simply skip over (e.g., ignore) the keyframe information.

Figure 5:
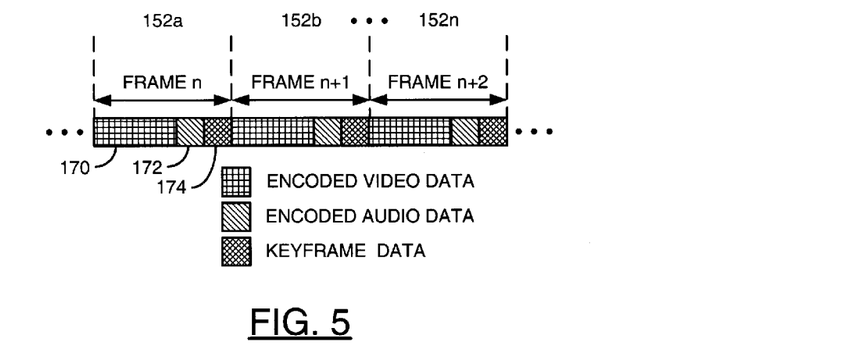
FIG. 5 illustrates the ideal format of each buffered frame in the system.

Referring to FIG. 5, an example of a number of frames 152a-152n is shown. The frames 152a-152n illustrate multiplexed data. For example, keyframe data is shown multiplexed into the bitstream along with an encoded audio and video frame. Each of the frames generally comprises an encoded video portion 170, an encoded audio portion 172, and a keyframe data portion 174.

Figure 6:
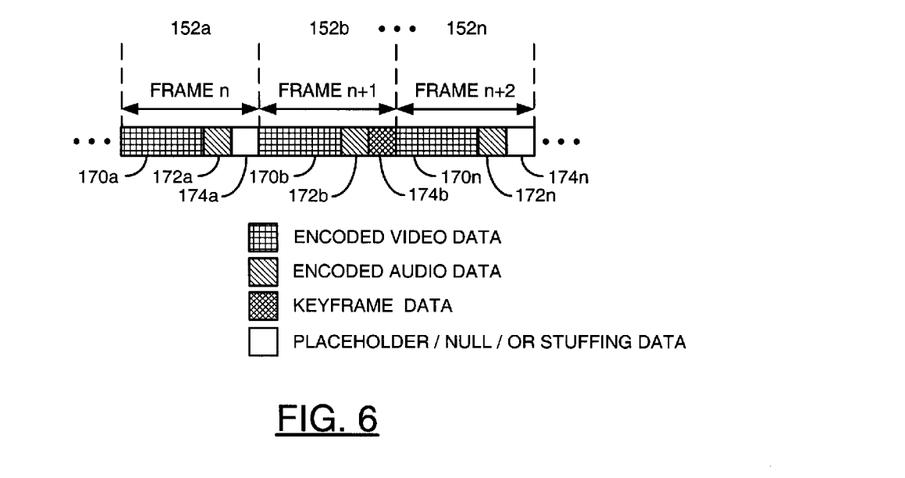
FIG. 6 illustrates a more typical or realistic format of each buffered frame in the system.

Referring to FIG. 6, an example illustrating an alternate multiplexing scheme is shown. The multiplexed data illustrates keyframe data multiplexed when available, but not necessarily at every frame time. For example, the frame 152a does not have keyframe data, but rather shows a null placeholder 174, which is illustrated with no shading. Placeholder data (e.g., null or stuffing bits) may be inserted when keyframe data is not available.

Figure 7:
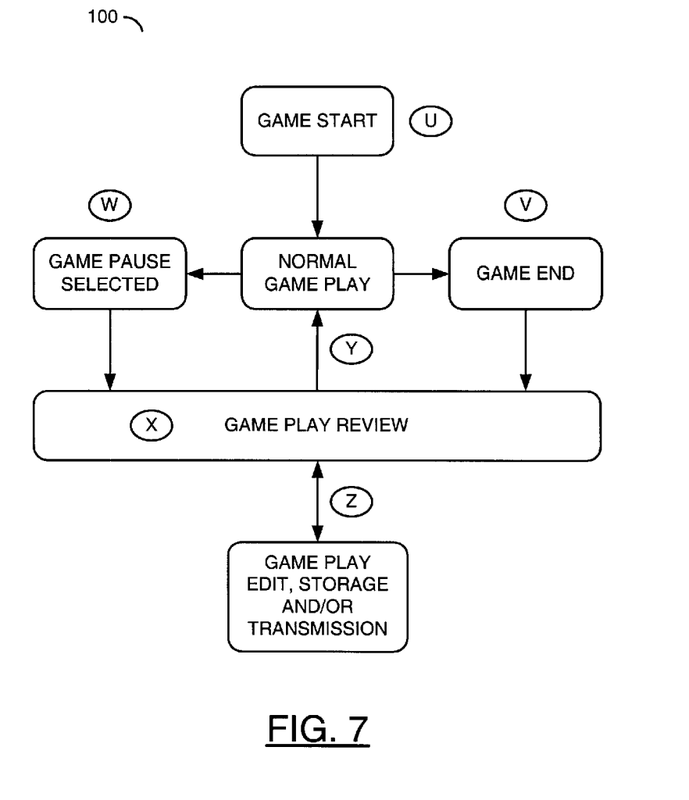
FIG. 7 illustrates a state diagram of a system implementing gameshift technology where the game is started as new.

Referring to FIG. 7, an example of a system 100 illustrating a game session is shown. An event U illustrates that the game universe is rendered at start time with no encoded audio and video or keyframe information inside the internal buffer. Normal game play follows. At an event V, the video console may either continue normal game play, or events and player actions may cause the game play to be ended, either as a successful run by the player or an unsuccessful run by the player (e.g., an event V). In addition, the player or game title may cause regular game play to be paused (e.g., an event W).

In either state (e.g., game end or game paused), the player now has the ability to (i) review the previous game play using player trickplay commands and/or (ii) edit a clip from the previous game play. The player has moved the system to game play review state (e.g., an event X). At any time during this review process, and/or as controlled by the console software and/or individual game title, and/or as a result of player controller input, the player may continue game play and move back to a normal (e.g., real time) game play state (e.g., an event Y). The desire to edit the previous game play action may move the player to a state where controller input may be used for editing functions and transmissions, or storage of a portion or all of the buffered game play (e.g., an event Z).

Figure 8:
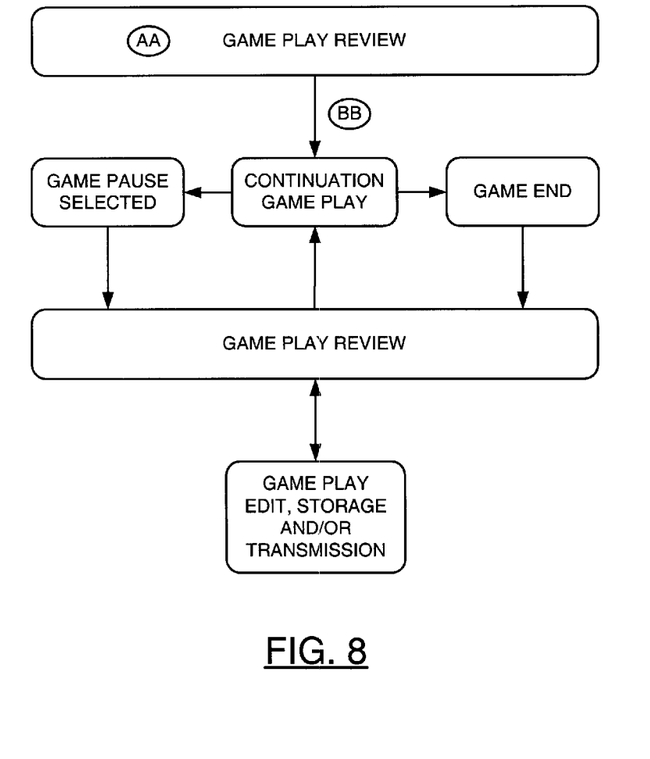
FIG. 8 illustrates a state diagram of a system implementing gameshift technology where the game play is a continuation of a previously played game.

Referring to FIG. 8, an illustration of the scenario of a player returning to a saved game or initiating game play on a game play clip that has been received or downloaded from another player is shown. An event AA illustrates that the player may review the previous game play using the trickplay functions previously described. An event BB shows a transition from game play review to live game play. In this state, the game console behaves as if the player has been playing the game sequence in real time without the review having occurred. The game universe is restored from a keyframe nearest to the audio and/or video frame currently being displayed. From this state, the video game console and gameshift allow the player to seamlessly capture his game play to be appended to the continue point of the previously buffered game play.

Figure 9:
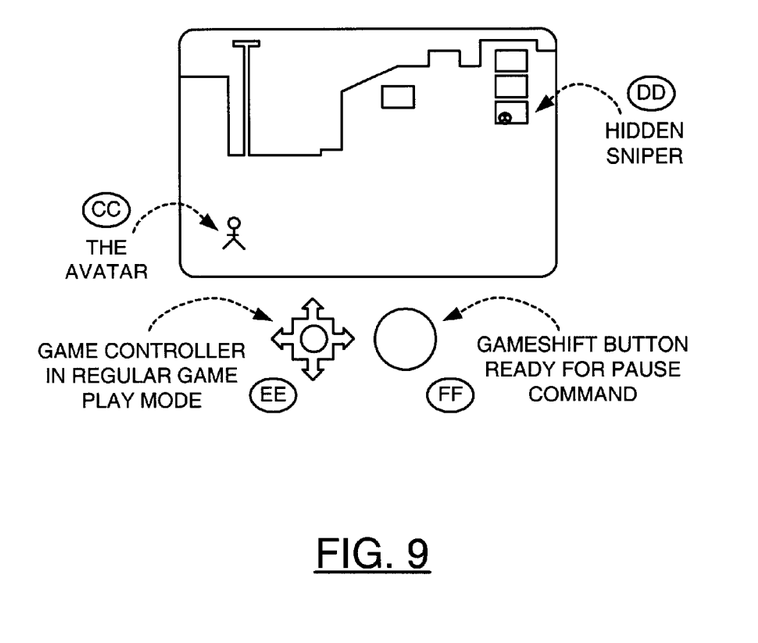
FIG. 9, FIG. 10, FIG. 11, FIG. 12, and FIG. 13 illustrate an example of a typical use case for gameshift technology, illustrating the motivation of a player to use advanced playback decode features in a video game.

Referring to FIG. 9, a typical usage of the gameshift feature of the present invention is shown. In this scenario the player's avatar is navigating through a simulation of an urban battlefield (e.g., event CC). A console generated sniper character is partially obscured inside the game universe (e.g., event DD). At this point, the game controller is in live game play mode, allowing the avatar to move inside the game universe (e.g., an event EE). The game console contains a user input button or mechanism that allows the user to pause the real time game play and audio/video output to the peripherals. This may be initiated by a gameshift button (e.g., an event FF).

Figure 10:
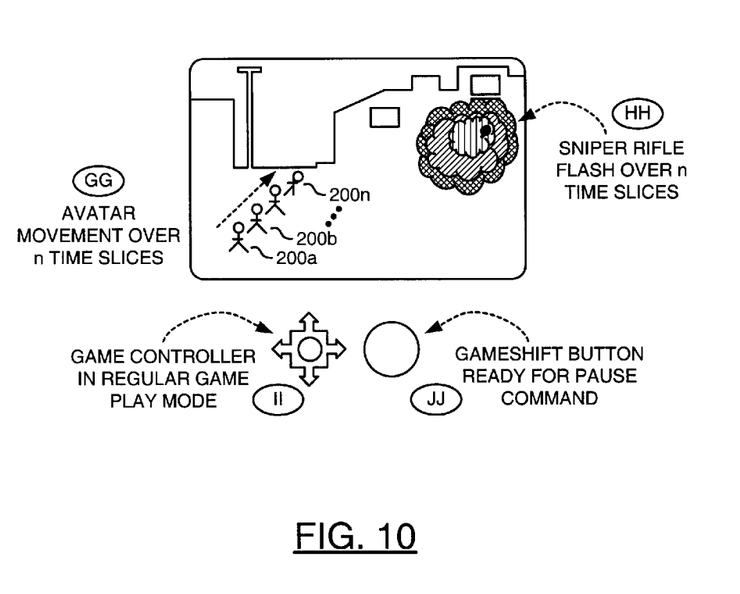

Referring to FIG. 10, an event GG shows an avatar moving in the game universe over a number of time slices 200a-200n. An event HH shows a sniper rifle flash over the same number of time slices. Many modern games are quite complex. For example, a hidden sniper is not readily seen by the player. After the initial rifle blast, smoke and debris hide the snipers exact location (e.g., shown as an event HH' in FIG. 11). An event II shows the game controller in regular game play mode. An event JJ shows the game shift button ready to receive a pause command.

Figure 11:
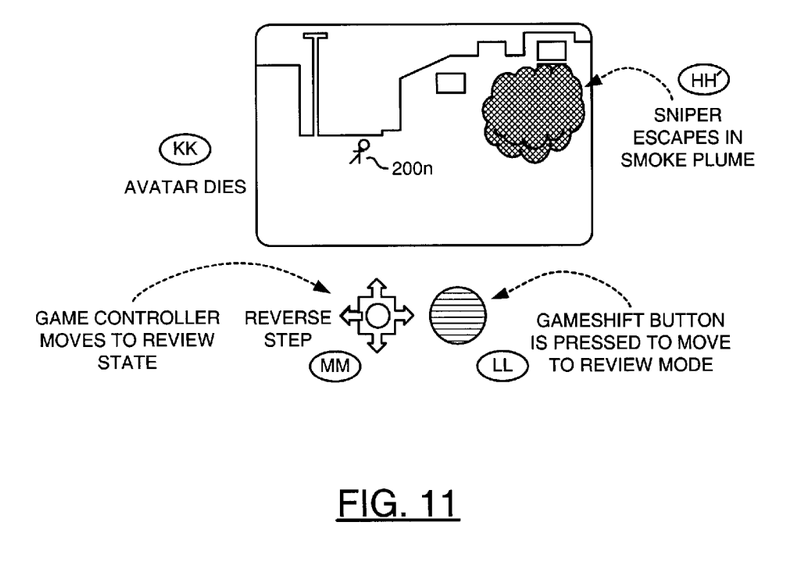

Referring to FIG. 11, an event KK shows the avatar dying on the time slice 200n, which causes the game play to end. The player now presses the gameshift button and changes console state to game play review (e.g., an event LL). The controller device may now be used to invoke audio/video decoder trickplay functionality (e.g., an event MM).

Figure 12:
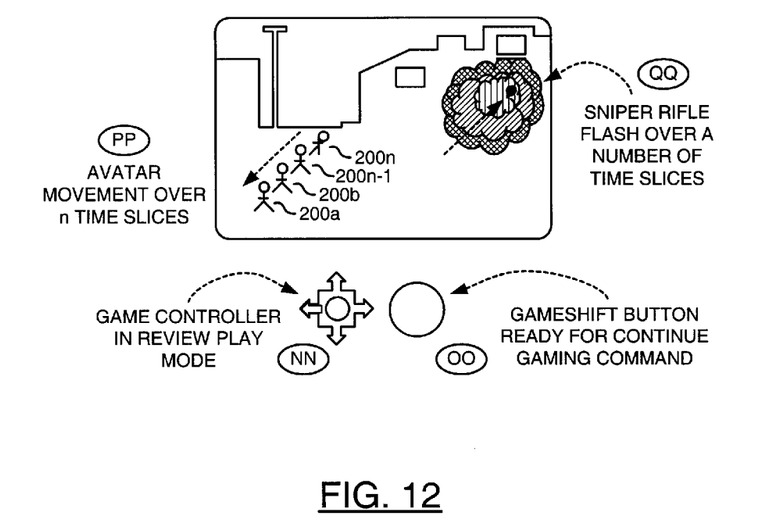
Figure 13:
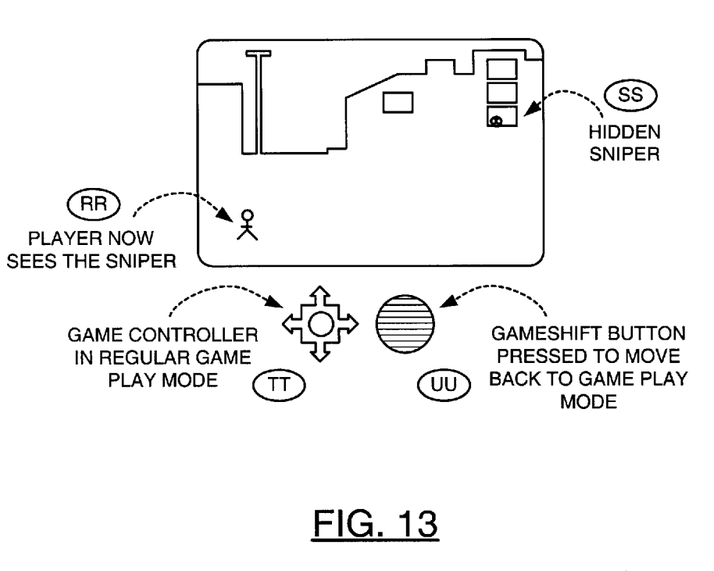

Referring to FIG. 12, an example of the review mode is shown. The player may, for example, invoke a "step backward" to move backward a number of time slices 200a-200n to expose the exact location of the sniper rifle. An event NN shows the game controller in review play mode. An event OO shows the game shift button ready for a continue gaming command. Using this mechanism the player may restart game play at a time frame before the sniper fires his rifle, shown by an event PP and an event QQ. Referring to FIG. 13, the player may now avoid the sniper fire (e.g., events RR and SS) actions and the game universe as a whole are recorded as encoded video and audio seamlessly to the previous game play. An event TT shows the game controller in regular game mode. An event UU shows the game shift button being pressed to move back to game play mode.

The circular buffer holding encoded video, audio and keyframe information described in FIG. 4, FIG. 5, and FIG. 6, is either being used for storing real time encoded video, audio and keyframe information or the buffer is being used for decode and playback, depending on what mode the game is currently in.

As described above, the actual video and audio output to the player is real time encoded with the keyframe information. This enables playback at any speed in either direction without loss of synchronization. Thus, the gameshift invention enables the player to exit playback mode directly into recording mode without disturbing the previously recorded game play sequence, thereby facilitating the creation of long continuous sequences.

As a result, one advantage of the gameshift invention is that it enables a player to create an encoded audio/video file that appears to be one continuous game play session, even though the player may have restarted game play many times to produce the audio/video sequence.

In addition, the saved encoded audio/video/keyframe sequence may be paused at any keyframe location during playback and game play can continue at that time/state by the same player or another player so that a new game play sequence may be generated from any point in the saved audio/video/keyframe sequence. In addition, because this solution enables smooth frame by frame viewing in either direction, the game play may be reviewed and enjoyed as any modern DVD audio/video output.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a game engine circuit configured to generate a video signal that represents a real time game environment that responds to one or more control signals;
   a controller circuit configured to generate said control signals in response to motion input received from a game user, said signals configured to control operations of an avatar of a game player within said real time game environment; and
   a replay circuit configured to (i) encode and store one or more portions of said video signal received from said game engine circuit as an encoded video signal and (ii) store one or more game restore points, wherein said game restore points and said encoded video signal are configured to (i) allow said game user to review a previously played portion of said game environment from said encoded video signal and (ii) resume playback in said real time game environment from one of said game restore points.

2. The apparatus according to claim 1, wherein (i) said game engine is further configured to generate an audio signal, and (ii) said replay circuit stores one or more portions of said audio signal.

3. The apparatus according to claim 1, wherein said encoded video signal and said game restore points are configured to be stored externally to a game system.

4. The apparatus according to claim 1, wherein said encoded video signal and said game restore points are configured to be loadable on a second game system remote from said game system.

5. The apparatus according to claim 1, wherein said replay circuit stores said encoded video signal and said game restore points in a format compatible for playback in a stand alone media player.

6. The apparatus according to claim 5, wherein said one or more game restore points are stored in a transport stream of a particular media playback specification.

7. The apparatus according to claim 6, wherein said stand alone media player skips over said one or more game restore points during playback.

8. The apparatus according to claim 5, wherein said signals from said controller input are graphically displayed during said review.

9. The apparatus according to claim 1, wherein said review comprises playing a scene using one of a plurality of trickplay features.

10. The apparatus according to claim 9, wherein said trickplay features are selected from the group consisting of $\frac{1}{64}\times$ playback, $\frac{1}{32}\times$ playback, $\frac{1}{16}\times$ playback, $\frac{1}{8}\times$ playback, ¼× playback, ½× playback, 1× playback, 2× playback, 4× playback, 8× playback, 16× playback, 32× playback, 64× playback, and frame by frame playback.

11. The apparatus according to claim 1, wherein said replay circuit is further configured to store said signals presented by said controller circuit.

12. The apparatus according to claim 11, wherein said replay circuit further is configured to allow said game user to modify said stored signals prior to resuming playback in real time.

13. The apparatus according to claim 1, wherein said apparatus is part of a game system.

14. The apparatus according to claim 1, wherein said replay circuit includes a storage circuit configured to store said portions of said video signal.

15. The apparatus according to claim 14, wherein said storage circuit is configured as part of a game system.

16. The apparatus according to claim 14, wherein said storage circuit is configured as a removable storage device.

17. The apparatus according to claim 16, wherein said storage circuit is selected from the group consisting of a hard disk drive (HDD), a flash device, and a memory device.

18. The apparatus according to claim 17, wherein said memory device comprises a flash memory, a nonvolatile memory.

19. A non-transitory computer readable medium containing processor executable instructions that when executed by a processor are configured to perform the steps of:
  (A) receiving a video signal that represents a real time game environment from a game universe engine;
  (B) receiving signals from a game controller operated by user, said signals configured to control operations of an avatar of a game player within said real time game environment; and
  (C) encoding one or more portions of said video signal as an encoded video signal; and
  (D) storing said encoded video signal and one or more game restore points on a memory accessed by said processor, wherein said method is configured to (i) allow said game user to review a previously played portion of said game environment from said encoded video signal and (ii) resume playback in said real time game environment from one of said game restore points.

* * * * *